United States Patent [19]

Printz et al.

[11] 4,026,753
[45] May 31, 1977

[54] APPARATUS FOR BUTT CONNECTION OF PLIES FORMED OF PLASTIC DEFORMABLE MATERIAL, ESPECIALLY RUBBERIZED STEEL CORD PLIES

[75] Inventors: Gerhard Printz, Vienna; Ralf Haase, Vienna-Mauer, both of Austria

[73] Assignee: Semperit Aktiengesellschaft, Vienna, Austria

[22] Filed: Feb. 20, 1975

[21] Appl. No.: 551,104

Related U.S. Application Data

[62] Division of Ser. No. 417,398, Nov. 19, 1973, Pat. No. 3,933,565.

[30] Foreign Application Priority Data

Nov. 20, 1972 Switzerland .................. 16846/72

[52] U.S. Cl. .................. 156/502; 100/295; 144/2 R; 144/317; 156/580
[51] Int. Cl.² .................. B31F 5/00; B32B 31/00; B30B 15/06
[58] Field of Search .......... 156/122, 137, 157, 159, 156/258, 266, 304, 502, 507, 580, 581, 73.4; 144/2 R, 317, 309 L; 100/295, 214

[56] References Cited

UNITED STATES PATENTS

| | | | |
|---|---|---|---|
| 2,195,683 | 4/1940 | Ross et al. | 100/295 |
| 3,130,100 | 4/1964 | Hasselquist | 156/157 |
| 3,345,238 | 10/1967 | Vanoni | 156/505 |
| 3,358,589 | 12/1967 | Hentzschel | 100/214 |
| 3,562,045 | 2/1971 | Hasegawa | 156/504 |
| 3,589,959 | 6/1971 | Sander et al. | 156/159 |
| 3,607,576 | 9/1971 | Phillips | 156/507 |
| 3,700,532 | 10/1972 | Pierson | 156/507 |
| 3,802,982 | 4/1974 | Alderfer | 156/304 |
| 3,817,802 | 6/1974 | Meyer | 156/73.4 |

*Primary Examiner*—Douglas J. Drummond
*Attorney, Agent, or Firm*—Werner W. Kleeman

[57] ABSTRACT

An apparatus for the butt connection of plies formed of plastic deformable material and having cut surfaces, comprising at least one contact beam which can be displaced at an inclination against the plies, this contact beam having a play contact surface for applying an inclined directed force to the plies which are to be butt connected.

6 Claims, 5 Drawing Figures

APPARATUS FOR BUTT CONNECTION OF PLIES FORMED OF PLASTIC DEFORMABLE MATERIAL, ESPECIALLY RUBBERIZED STEEL CORD PLIES

CROSS-REFERENCE TO RELATED CASE

This application is a divisional application of our copending commonly assigned application Ser. No. 417,398, filed Nov. 19, 1973 now U.S. Pat. No. 3,933,565.

BACKGROUND OF THE INVENTION

The present invention relates to a new and improved construction of apparatus for butt connecting plies of plastic deformable material, if desired containing reinforcement inserts, especially rubberized steel cord plies, and also pertains to a novel method for such butt connecting of plies.

During the production of endless plies it is necessary to join together individual ply elements with one another into a continuous web. There is known to the art a method and apparatus for the butt connection of flexible strips, wherein both ends of the strips, which previously have been rendered adhesive, are connected by an elastic element which tangentially acts upon the ends. The drawback of this known apparatus resides in the great technological expenditure which is required. Thus, apart from the clamping plates which are needed for fixing the strips, there are also necessary devices for moving such clamping plates, an elastic membrane, as well as devices for stressing and relieving such membrane, and also lengthwise guides for the strips. This complicated construction renders the equipment extremely subject to malfunction. Also what is disadvantageous for this technique is the fact that the strips must be rendered adhesive. This can be carried out by applying a binder or by electrical, chemical or thermal treatment. In any event, there is necessary an additional working step and additional equipment. Furthermore, with this prior art technique there is not realized any smooth surface at the butt joints or locations, rather there are present irregularities, damming-up of the material and inhomogeneities. Also disadvantageous with this state-of-the-art procedure is that this technique only can be carried out with strips of very small width, since when using strips of greater width there only can be obtained an insufficient tangential action by the elastic elements, so that the strips cannot be sufficiently rigidly connected with one another.

Moreover, there is known to the art an apparatus for the production of an endless fabric band with wire cores or inserts which are arranged at an angle. This equipment comprises a splicing table, supports, infeed components, components for moving and depositing the band as well as a cutting device and magnetic holding devices. When using this equipment it is possible to obtain a good fixation of the fabric bands which are to be connected, but the connection itself of such fabric bands must be manually performed. Consequently, working with this equipment requires a great deal of time and there is not insured for the necessary accuracy.

SUMMARY OF THE INVENTION

Hence, it is a primary object of the present invention to provide an improved construction of apparatus for the butt connection of plies formed of a plastic deformable material in a manner not associated with the aforementioned drawbacks and limitations of the prior art proposals.

Another and more specific object of the present invention aims at providing an improved construction of apparatus for the butt connection of plies, while avoiding the aforementioned drawbacks, and while providing a relatively rapid and simple operating procedure, and wherein at the same time there can be realized a high degree of accuracy of the connected plies.

Now in order to implement these and still further objects of the invention, which will become more readily apparent as the description proceeds, the method aspects of this development are manifested by the features that the cut or cutting surfaces of the piles which are to be connected together are beveled or angularly cut parallel to one another, positioned so as to be mutually elevationally offset with respect to one another, and then joined together by application of pressure. By virtue of this operating technique there can be realized a completely smooth surface at the joint or connection location without any build-up or damming-up of material. Due to the fact that the surfaces of the plies which are to be connected are beveled or tapered, there is avoided, on the one hand, that air will be entrapped and, on the other hand, due to the larger surface of the connection or joint location there is realized an exceptionally good adherence or joining of the layers with one another.

With the inventive method, especially when connecting rubberized steel cord plies, there can be obtained an extremely good and sturdy connection if the plies which are to be interconnected are cut or biased at an inclination, preferably at an angle of about 60°, whereby at one of both cut surfaces the cord at its margin, referred to as the marginal cord, is partially freely exposed or bared or only slightly remains covered by rubber, whereas the other marginal cord remains covered by rubber of approximately the width of the intermediate space between two cords or is partially bared or exposed. If the cutting angle is considerably steeper, then during the joining together of the mutually elevationally offset positioned plies there already arise small inaccuracies in the butt connection, whereas if such cutting angle is considerably flatter, then during the subsequent proposed linear alignment there can occur deformations of the edges. Since both of the plies, prior to being joined together by the application of pressure, are positioned so as to be mutually elevationally offset, there is realized by virtue of the complementary tapering of both cutting surfaces, while taking into account the rubber material which fills out the intermediate space between two cords, a butt connection in which the spacing of both marginal cords from one another corresponds to the spacing of the cords in the piles.

In particular in the case of steel cord reinforced plies, notwithstanding cutting with a linearly traveling knife, due to internal stresses there is oftentimes produced a cut surface which deviates slightly from the straight line. When joined together this leads to the result that both of the cut surfaces do not bear against one another along individual partial regions. When carrying out the inventive method it has therefore been found to be advantageous if the cut or cutting surfaces of the plies which are to be interconnected, prior to joining together, are aligned linearly and parallelly with regard to one another and fixed in this position. In this way there is realized a particularly great accuracy of the connection and in a particularly simple manner it is insured that the plies will assume the desired position during their connection.

A position which is particularly favorable for the connection of the plies also can be realized in that the cutting surfaces of the plies which are to be interconnected are positioned so as to be mutually elevationally offset by somewhat less than the thickness of one ply. If the elevational offset position is considerably greater than usually the fixation of the linearity of the cutting surfaces of the upper ply only can be attained with difficulty and there can arise inaccuracies during joining together. If the elevational offsetting is considerably less, then the inventive effect, particularly the later proposed flowing into one another of the rubber residues or material surrounding the marginal cords, no longer is completely realized.

In order to obtain a particularly faultless connection or joint it has been found to be advantageous to position the cutting surfaces of the piles which are to be interconnected, prior to their joining together, such that they slightly overlap one another in such a way that the centers of both marginal cords which come to lie adjacent one another at the joint connection, measured parallel to the plies, possess a spacing which amounts to between one-quarter and an entire cord diameter. If the spacing is considerably greater, then there is present the danger that too little rubber material will remain at the butt connection, so that thereafter both of the marginal cords can be more easily separated from one another than two random other cords in the ply. If the spacing is considerably less, then there is present the danger that the marginal cord of the upper ply will no longer slide along the marginal cord of the lower ply, rather will slide over such, or in fact will be pressed behind such at zones. Consequently, there will be produced inaccuracies and faulty locations at the butt connection.

If the force or pressure which is employed for joining together the plies is exerted at an inclination to the plies, and if such is a resultant force from a respective force component extending parallel to the plies and perpendicular to the plies, then during joining together of the plies there is produced a flow of the plastically deformable material of the plies and thus a particularly intimate connection. The angle of this resultant force is preferably approximately of the same magnitude, but viewed from the vertical directed to the other side, as the angle at which the cutting surfaces of both plies are tapered or beveled.

An optimum butt connection then can be realized if the overlapping and the angle at which the force or pressure required for joining together impinges at the joint connection, are accommodated to one another such that both marginal cords slide-off along one another, with the result that between the same the rubber residues surrounding such flow into one another. It has been surprisingly found that even when for both of the steel cord plies which are to be connected the marginal cord is partially bared or exposed, there is still realized an exceptional and particularly homogeneous connection of the plies.

As previously mentioned, the invention is not only concerned with the aforementioned method aspects, but also with a new and improved construction of apparatus for the performance of such method wherein there is provided at least one press-on or contact beam which significantly can be displaced at an inclination along the plies, such press-on or contact beam having a contact surface which is perferably flattened parallel to the plies. It has been surprisingly found that for as homogeneous as possible butt connection what is decisive, among other things, is particularly the angel at which the force or pressure acts upon both cutting or cut surfaces. A perpendicularly acting press-on or contact beam would press at a very flat angle of about 30° against the cutting surfaces which are beveled or angularly cut at an angle of 60°, whereas a contact or press-on beam which is guided at an inclination towards the other direction through an angle of 30° would press at an angle of about 60° at the cutting surfaces and thus would considerably more favorably influence the flowing together of the rubber residues or residual rubber material which surrounds the marginal cords.

If the contact surface of at least one contact or press-on beam is constructed in cross-section so as to be slightly convexly domed or convexly arched, then there can be realized with such type equipment, especially with rubberized steel cord plies, a particularly rigid and uniform connection, since in this case the force or pressure which presses together the plies can be transmitted exceptionally well to the joint.

It is particularly advantageous if there are provided for both of the cutting or cut surfaces which are to be connected together linear impact ledges which are parallel to one another and preferably pivotable or tiltable, as well as gripper elements which are arranged at a slight spacing from and parallel to the cutting surfaces over the entire width of the plies to be interconnected, and which gripper elements press the cutting surfaces in sections or zones against the impact ledges. Such gripper elements can be, for instance, resilient pins, or bolts which can be pressed against one another and arranged in superimposed fashion below and above the marginal zones of both plies.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
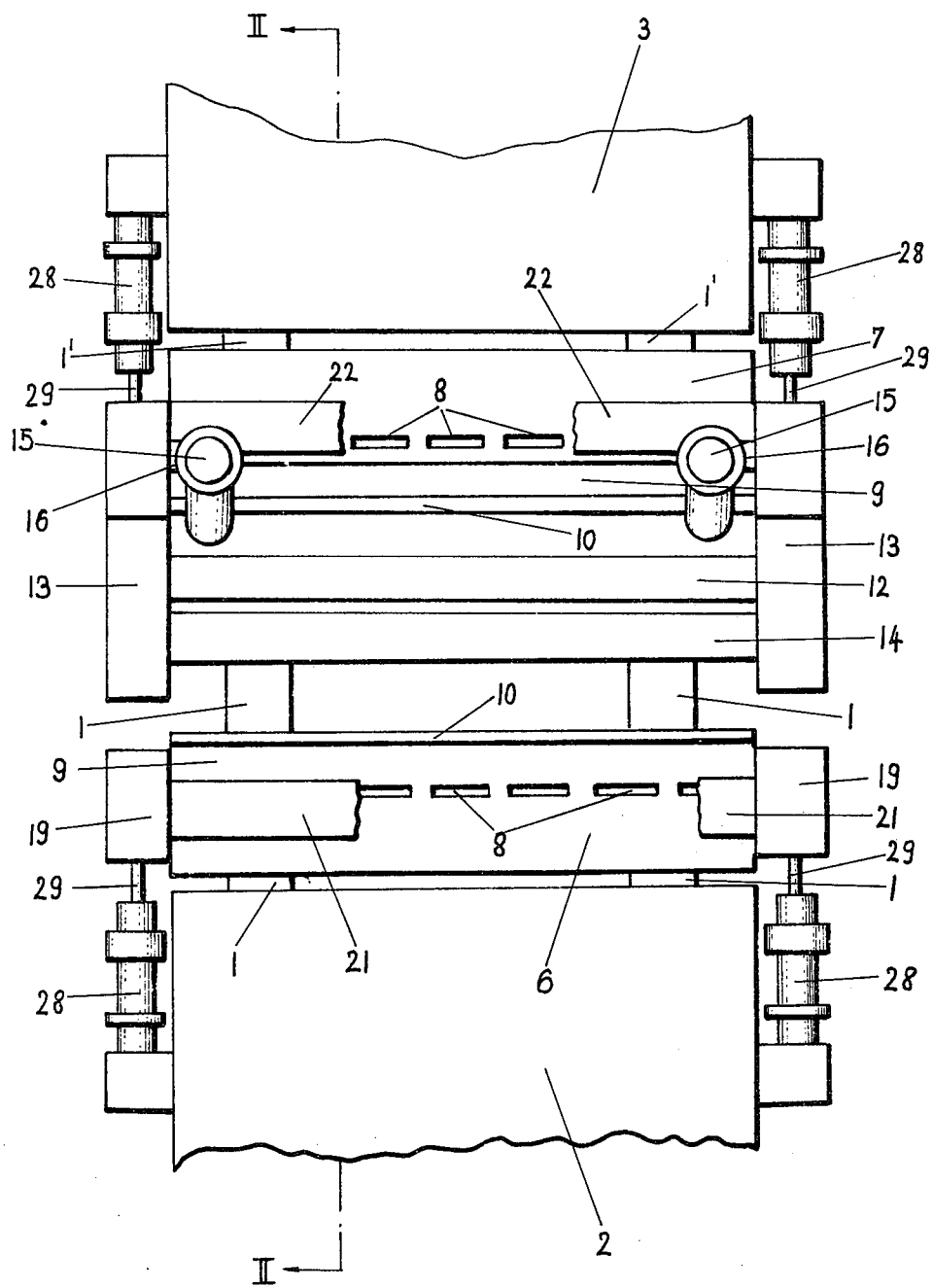
FIG. 1 is a plan view of an exemplary embodiment of apparatus wherein for the sake of improving clarity in illustration there have been conveniently omitted the plies, the cutting-, the positioning-, the displacement- and the winding devices.
Figure 2:
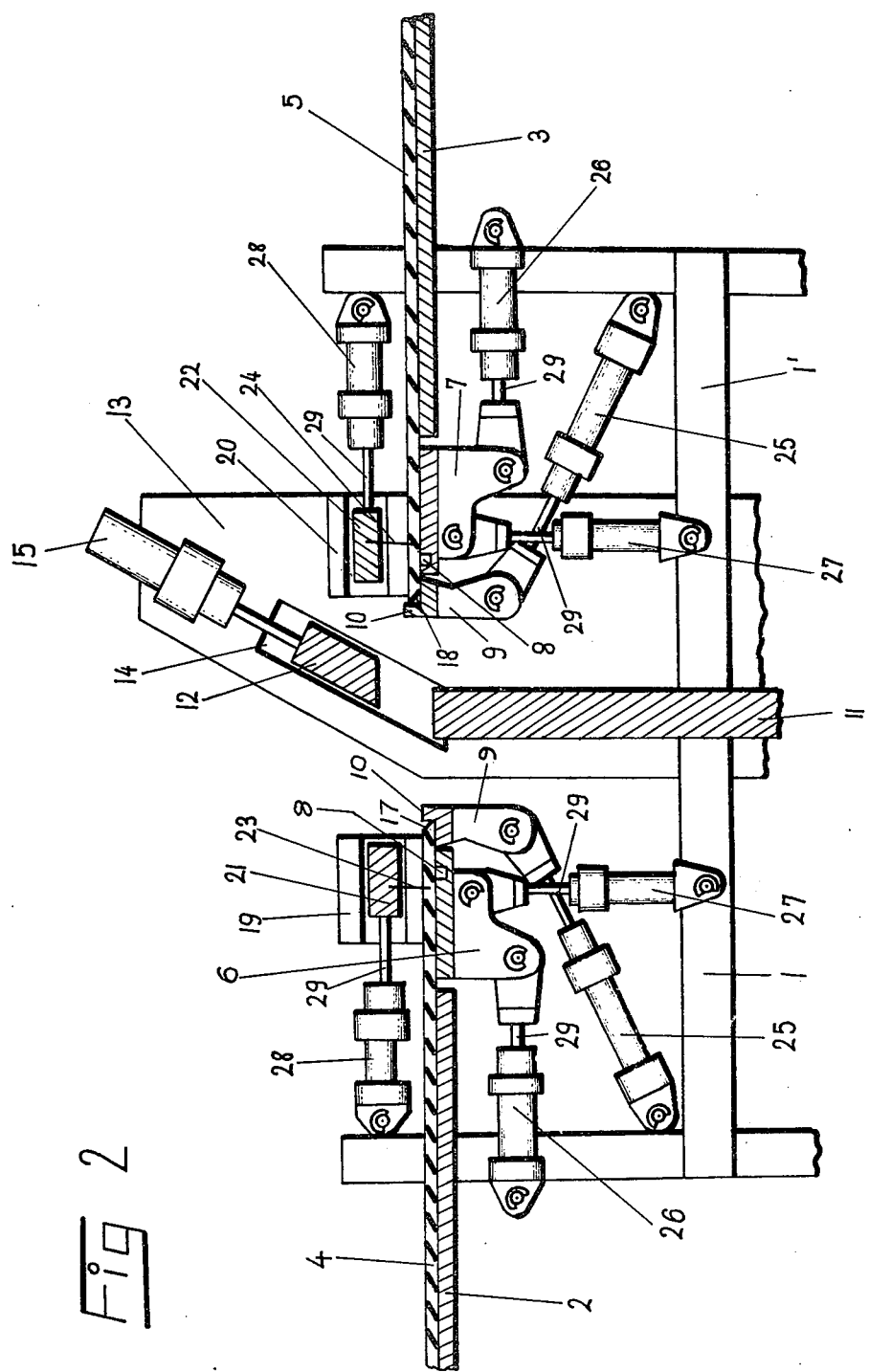
FIG. 2 is a partial cross-sectional view of the arrangement of FIG. 1, take- along the line II—II thereof, wherein also in this case for the sake of perserving clarity in illustration the cutting- positioning, displacement- and winding devices have been omitted.

Describing now the drawings, th exemplary embodiment of apparatus depicted in FIGS. 1 and 2 consists of a stationary frame unit 1 and 1' at which there are arranged support plates or sheet metal support members 2 and 3 for the plies 4 and 5, the movable vacuum plates 6 and 7 with the recesses or depressions 8, the pivotal stops 9 with the impact or stop ledges 10 and the lower press-on or contact beam 11 located at a slight spacing therebetween.

Apart from the foregoing structure the equipment of this development is also provided with an upper press-on or contact beam 12, which moves at an inclination, as shown, and which is guided at the frame 13 by the guide means 14. Double-acting piston-cylinder units 15 serve to move the upper contact beam 12, these piston-cylinder units being connected via the supports 16 at the frame 13. The apparatus also further possesses two devices for pressing the cut or cutting surfaces 17 and 18 of the plies 4 and 5 against the impact ledges 10 and which consist of the frames 19 and 20 and the support 21 and 22 for the gripper elements 23 and 24. The displacement means for the stops 9, for the vacuum plates 6 and 7 and for the resilient gripper elements 23 and 24 consist of double-acting piston-cylinder units 25, 26, 27, 28, which through the agency of associated piston rods 29 actuate the corresponding devices.

Figure 3:
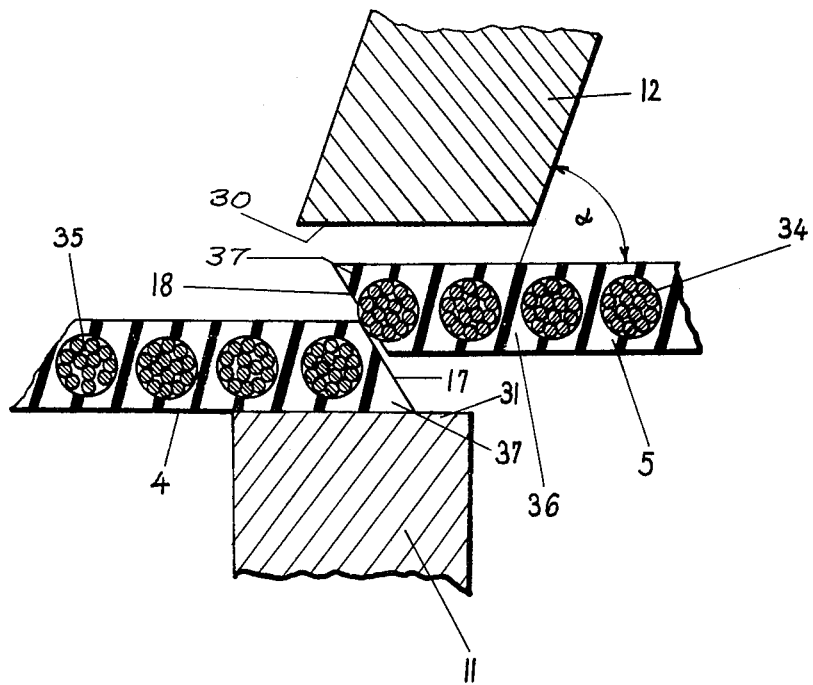
FIGS. 3 and 4 are respective partial sectional views through the equipment depicted in FIG. 2, wherein respective different ply structures are shown and the plies are depicted prior to being joined together.
Figure 4:
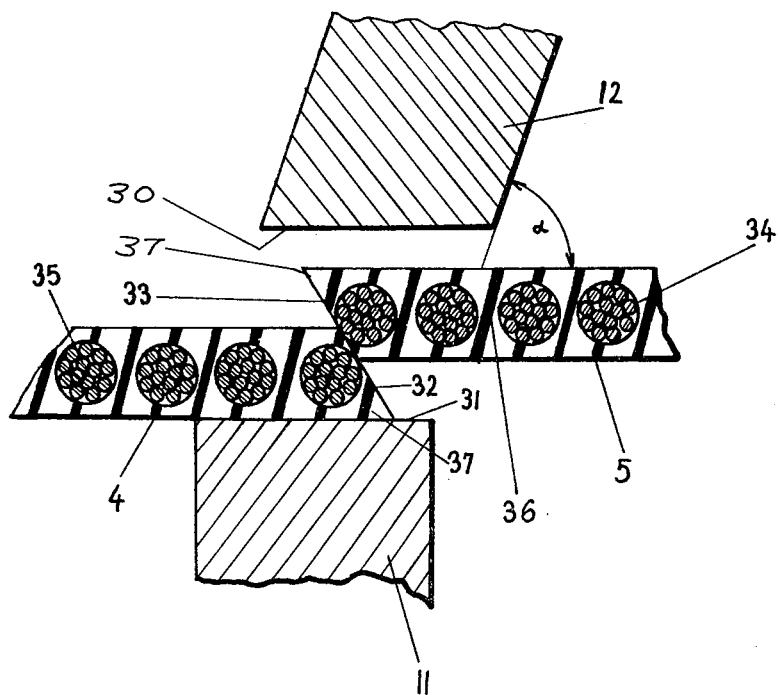

The embodiments depicted in FIGS. 3 and 4 portray an upper inclined traveling press-on or contact beam 12 with its contact surface 30 and a stationary lower press-on or contact beam 11 with its contact surface 31. Between both of the contact beams 11 and 12 there are located both of the plies or layers 4 and 5 which are mutually elevationally offset in position and already placed in contact with one another. They contact or abut one another at their cut or cutting surfaces 17 and 18 (FIG. 3) and 32 and 33 (FIG. 4) respectively.

In FIG. 3 the cut surfaces 17 and 18 of the plies 4 and 5 are cut at an inclination to the plies 4 and 5, preferably at an angle $\alpha$ of about 60°, and at the cut surface 18 the marginal cord 34, which consists of intertwined steel wires or cables 35, is partially freely exposed, as shown. At the cut surface 17 the marginal cord 34 is covered by rubber 36 of approximately the width of the intermediate space between two such cords. The elevational offsetting of the plies 4 and 5 amounts to somewhat less than the thickness of one ply.

In FIG. 4 the cut or cutting surfaces 32 and 33 of the plies 4 and 5 are angularly cut or beveled such that the marginal cords 34 of both of the plies 4 and 5 which are to be interconnected are partially freely exposed.

In FIGS. 3 and 4 the contact surfaces 30 and 31 of the upper contact of press-on beam 12 and the lower contact or press-on beam 11 respectively, are constructed so as to be parallel to the plies 4 and 5. The angle $\alpha$ which is formed by the upper contact beam 12, which can be displaced at an inclination downwardly, and the ply 5, in this case amounts to about 70°. At the cut surfaces 17 and 18 and 32 and 33 respectively of the plies 4 and 5 there are present rubber residues or residual material portions 37.

Figure 5:
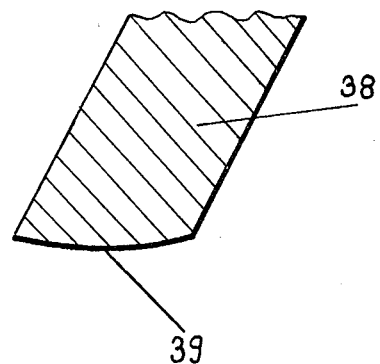
FIG. 5 is a cross-sectional view through a press-on or contact beam equipped with a convex press-on or contact surface.

FIG. 5 shows an upper contact or press-on beam 38 in cross-section, the contact surface 39 of which is constructed to be slightly convexly domed or convexly arched. This upper contact or press-on beam 38 can be used in the equipment of this development instead of the contact or press-on beam 12.

There will be now hereinafter described in conjunction with the equipment of this development, as illustrated in the drawings, the performance of the butt connection technique, particularly while referring to FIGS. 1, 2, 3 and 4.

A cutting device which has not been particularly depicted in the drawings and may be of any suitable and conventional design, cuts plies formed of plastic deformable material, and if desired containing reinforcement inserts, especially rubberized steel cord plies, into sections, in which the cord in the lengthwise direction is arranged parallel adjacent one another in the plies These sections then carry out a rotation of 90° about their center, so that upon pressure-joining together the steel cord plies which are to be interconnected into an endless ply, the cord is located perpendicular to the lengthwise direction of the produced endless ply. The cut surfaces 17 and 18 (FIG. 3) or 32 and 33 (FIG. 4) of the plies or layers 4 and 5 which are to be connected together are cut parallel to one another and parallel to the lengthwise axes of the marginal cords 35 and at an angle $\alpha$ preferably of about 60°, so that at one of both cutting surfaces 17 and 18 the marginal cord 34 is partially exposed or bared or only slightly covered by rubber 36. Another possibility would be, as shown in FIG. 4, to bevel the cut or cutting surfaces 32 and 33 such that both marginal cords 34 are partially exposed or bared. Then the plies 4 and 5 which are to be interconnected are transported by means of a not particularly illustrated suitable transport device to a positioning device which brings such plies into the appropriate position at the support members or plates 2 and 3. In so doing, the cut or cutting surfaces 17 and 18 or 32 and 33 respectively, of the plies 4 and 5, prior to their being joined together by application of pressure are positioned so as to be mutually elevationally offset with respect to one another by an amount which is slightly less than the thickness of one ply. Then prior to joining together of the plies there is undertaken an alignment at the linear pivotal stops 9 which are in parallelism with one another and equipped with the impact or stop ledges 10. The alignment operation occurs by means of a device arranged over the entire width of the plies 4 and 5 to be interconnected with the aid of the gripper elements 23 and 24, which for instance may be constituted by resilient pins or bolts arranged in superimposed relationship below or above the marginal zone of both plies 4 and 5 and can be pressed against one another. These resilient pins or bolts are secured at the supports or carriers 21 and 22 which are moved in the frames 19 and 20 by the double-acting piston-cylinder units 28. This device presses the cut surfaces 17 and 18 or 32 and 33 respectively, in sections or zones against the impact ledges 10. In this position the plies 4 and 5 are then fixed or held at the vacuum plates 6 and 7, which have recesses or bores 8, by application of a vacuum, fixing of the plies occurring such that every positional change of the plies is rendered impossible. Such then renders possible proceeding with the further operational steps of the method of the invention.

After the aforedescribed fixation of the plies, the gripper elements 23 and 24 which are required for leveling, are moved by means of the double-acting piston-cylinder units 28, which engage by means of their piston rods 29 at the supports 21 and 22, out of the direct region of the cutting surfaces 17 and 18 or 32 and 33 respectively, of the plies which are to be interconnected, in a direction which is tangential with respect to the plies 4 and 5 to the region of the contact beams 11 and 12. The mutually elevationally offset cut or cutting surfaces 17 and 18 or 32 and 33 of the plies 4 and 5 which are to be interconnected are moved to such an extent towards one another that they thus slightly overlap one another such that the centers of the two cords 34 which come to lie next to one another at the butt or connection joint —measured parallel to the plies 4 and 5— possess a very small spacing or small as possible spacing from one another, which preferably amounts to about one-half of the cord diameter. Then there takes place a lowering of the vacuum plate 7 to the corresponding height of the vacuum plate 6, both vacuum plates 6 and 7 then being located in one plane. The mutually elevationally offset cut surfaces 17 and 18 or 32 and 33 of the plies 4 and 5 to be interconnected contact one another. Thereafter there is undertaken the joining together or connection of the plies 4 and 5 by a pressing operation i.e. application of pressure, wherein the upper press-on or contact beam 12 which travels downwardly at an inclination, and actuated by the double-acting piston cylinder units 15, presses the cut surfaces 17 and 18 or 32 and 33 of both of the plies 4 and 5 to be interconnected against the lower press-on or contact beam 11 which serves as a support and thus joins together the plies 4 and 5 by a mutual contacting sliding of the marginal cords 34 over one another, whereby between such the rubber residues or residual material 37 surrounding the same flow into one another. Now there takes place the retraction of the individual elements of the equipment back into the starting position, after destroying the vacuum, by means of the double-acting piston-cylinder units 15, 25, 26, 27. The aforementioned procedure can be then appropriately repeated.

While there is shown and described present preferred embodiments of the invention, it is to be distinctly understood that the invention is not limited thereto, but may be otherwise variously embodied and practiced within the scope of the following claims. ACCORDINGLY,

What I claimed is:

1. In an apparatus for the butt connection of plies formed of plastic deformable material and having cut surfaces to be butt connection to one another, comprising means for positioning the confronting cut surfaces of said plies to be butt connected in slight overlapping relationship forming a butt contact, at least one contact beam which can be displaced at an inclination against the butt contact of the plies, said contact beam having a ply contact surface which extends over the entire line of butt contact of the plies, means for guiding said one contact beam for displacement at an inclination against the plies in order to relatively move the plies towards one another, means for displacing said one contact beam in order to apply an inclined directed force at said plies, said contact beam having a lengthwise axis located in a plane which is inclined with respect to the butt connection of the plies containing the cut surfaces.

2. The apparatus as defined in claim 1, wherein said contact surface possesses a flat surface portion which is essentially parallel to the plies.

3. The apparatus as defined in claim 1, wherein said contact surface of said contact beam viewed in cross-section, possesses a slightly domed convex configuration.

4. The apparatus as defined in claim 1, including a further ply contact beam cooperating with said one contact beam.

5. In an apparatus for the butt connection of plies formed of plastic deformable material and having cut surfaces to be butt connected to one another, comprising at least one contact beam which can be displaced at an inclination against the plies, said contact beam having a ply contact surface which extends over the entire line of butt contact of the plies, means for guiding said one contact beam for displacement at an inclination against the plies in order to relatively move the plies toward one another, means for displacing said one contact beam in order to apply an inclined directed force at said plies, said contact beam having a lengthwise axis located in a plane which is inclined with respect to the butt connection of the plies containing the cut surfaces, stop means for the cut surfaces of the plies which are to be connected with one another, said stop means being equipped with linear impact ledges which are substantially in parallelism with one another, gripper elements arranged at a slight spacing from and parallel to the cut surfaces over the entire width of the plies to be interconnected, said gripper elements serving to press the cut surfaces at zones thereof against the impact ledges.

6. The apparatus as defined in claim 5, further including means for tilting said impact ledges.

* * * * *